(12) United States Patent
Johansson et al.

(10) Patent No.: US 7,392,868 B2
(45) Date of Patent: Jul. 1, 2008

(54) DEVICE AT HANDTRUCK

(75) Inventors: Rune Johansson, Mjölby (SE); Lars Eriksson, Mantorp (SE); Joakim Gustavsson, Mjölby (SE)

(73) Assignee: BT Industries AB (SE)

( * ) Notice: Subject to any disclaimer, the term of this patent is extended or adjusted under 35 U.S.C. 154(b) by 286 days.

(21) Appl. No.: 10/542,291

(22) PCT Filed: Jan. 28, 2004

(86) PCT No.: PCT/SE2004/000107

§ 371 (c)(1),
(2), (4) Date: Jul. 15, 2005

(87) PCT Pub. No.: WO2004/067350

PCT Pub. Date: Aug. 12, 2004

(65) Prior Publication Data

US 2006/0048979 A1    Mar. 9, 2006

(30) Foreign Application Priority Data

Jan. 31, 2003    (SE) .................................. 0300241

(51) Int. Cl.
*B62D 51/04* (2006.01)

(52) U.S. Cl. ................ 180/19.1; 280/3; 280/246; 74/157

(58) Field of Classification Search ............. 180/19.1; 280/3, 246; 74/157
See application file for complete search history.

(56) References Cited

U.S. PATENT DOCUMENTS

| 2,620,198 | A | * | 12/1952 | Johnston | 280/3 |
| 3,549,161 | A | * | 12/1970 | Pusztay et al. | 280/3 |
| 3,738,672 | A | * | 6/1973 | Dalton | 280/3 |
| 3,937,479 | A | * | 2/1976 | Dalton | 280/3 |
| 4,227,706 | A | * | 10/1980 | Morris | 280/3 |

FOREIGN PATENT DOCUMENTS

| DE | 299 18650.4 | 2/2000 |
| EP | 0287483 | 10/1988 |
| SE | 404520 | 10/1978 |

* cited by examiner

*Primary Examiner*—Lesley D. Morris
*Assistant Examiner*—Michael Stabley
(74) *Attorney, Agent, or Firm*—Hayes Soloway P.C.

(57) ABSTRACT

Tiller truck provided with force transmitter in order to transmit a pumping movement with the tiller to the wheels via a coupling in order to facilitate the movement of the truck. The coupling is arranged so that it can be set for force transfer forward or rearward or in an entirely free position. A control for the control of the coupling is arranged in the tiller handle.

26 Claims, 5 Drawing Sheets

DEVICE AT HANDTRUCK

BACKGROUND OF THE INVENTION

At for instance loading of goods arranged on loading pallets, on and off lorries it is well known to use handtrucks that accompany the lorry. Lifting at these take place by a pumping with the tiller. Since these handtrucks are comparatively small and light the influence on the loading capacity of the truck as to weight and volume is very small. As long as the platform of the lorry or other floor is level and sufficiently even remarkably great loads can by hand be moved with a moderate effort. Should however the lorry be standing inclined it may become very tiring. The same thing is the case if the ground is uneven or if there is sand, small stones or other rubbish on the ground. Already a string of some or a couple of millimeters can constitute a difficult obstacle to pass even on otherwise even floors in stores, where trucks of this kind are frequently used. In particular if the obstacle, however small, lies close to one of the truck wheels at starting this is difficult to overcome since the truck has no speed. When the truck has gained a bit of speed the movement only has to be sustained and with the help of the speed obstacles can be passed that otherwise are impossible to overcome directly. In particular for lighter users with consequently less available pulling force the above may be a serious problem and it is not always possible to back up and gain speed.

In view of the above the object of the invention is to provide a facilitating aid for use when it is heavy to move the truck or get it started.

SUMMARY OF THE INVENTION

In accordance with the invention this object is solved by the use of the tiller as lever for a movement that is transferred to the steering wheel or wheels of the truck via force up-stepping means, force transferring means and a coupling device. The movement is preferably transferred so that the tiller is pivoted in the same direction as one wants the wheel or wheel pair to rotate. In this way the movement of the tiller will be very natural and furthermore the total pulling force will be the sum of the force that is geared up and the force that the user exerts on the tiller. If one is unable to start the truck in one or the other direction one takes so to say a new grip or pump stroke with the tiller, connects the force transfer and pulls the tiller handle so that truck is influenced by a force that is many times the pulling force that the user by himself is able to exert.

The coupling device for transfer of the geared up force from the tiller handle to the steerable wheel or wheels has two drive positions, one forward and one rearward and furthermore includes free wheeling means so that the truck can be wheeled freely in the direction that the force transfer is set for. Furthermore there is an entirely free run or neutral position, in which force to or from the tiller can not be transferred in one or the other direction. This position is at the same time the normal position and the position in which the tiller can be used to pump up the forks in the known manner. In this position the force transfer does not have to be switched to its intended direction of movement but the truck may be moved forth and back, for instance when at transporting the load is moderate or the ground even and horizontal or at the positioning of a truck under a loading pallet when one may need to push the truck forth and back rather quickly to get it in the right position.

The down gearing of the tiller movement to a small truck movement enables a considerable increase of the precision with the invention, in particular at heavier loads and/or uneven ground, when small movements are desirable to position a load in precisely the right position. This reduces essentially the risk of damages, at heavier loads as well as at lighter loads.

The invention may also be used to brake or lock the truck against rolling on an inclined ground by placing the tiller in an end position at the same time as the coupling is brought to a force transferring position. By for instance placing the tiller in its upper end position at the same time as the coupling is positioned for movement in the forward direction movement in the fork direction will be prevented. Rolling backward at the passing of inclines by means of the invention can thus not take place with more than at most the correspondence of one tiller stroke, if the tiller is quickly brought up (or down at the pushing of the truck) no rearward movement will have the time to start. This makes it possible to increase the safety at the handling of goods further. The braking can of course also be used if one with a too large load gets on an inclined plane or the like situation. If for instance the truck starts to push on one simply puts the coupling in the control position for driving in the opposite direction resulting in the force braking the truck becoming several times larger than the one that has to be exerted on the handle.

The force transfer from the tiller of the truck to the wheel or wheels preferably includes a crank arm close to the wheels journaled concentrically with these and a pulling and pushing forces transferring link connecting the crank with the tiller. The gearing can either be dimensioned at fabrication; alternatively one may consider it to be individually adaptable, for instance by a displacing of the journal points of the link on the tiller or the length of the crank on the wheel axle that in turn is used to drive the wheels. One can even consider to arrange a planet gear, possible one in each wheel.

One can also consider that the degree of resistance control the gearing ratio by letting the hinging point in the tiller for the transfer of the force to the wheel be displaceable against the influence of a spring.

Advantageously the switching of the force transfer between forward, backward and free or neutral with a control in the handle end of the tiller, takes place for instance via one or several wires.

In the handle of the tiller a control is arranged for the choice of drive aid rearward backward and free respectively, which control may be designed to cooperate with or be integrated with the control for lifting and lowering of the load so that one does not by mistake try to execute several each other counteracting measures at the same time. The control may for instance have a similar design as the speed control of a truck. In this way the function becomes easy to understand and handle and one does not have to learn different hand grips for different trucks. The control may either be so arranged that it remains in the set position or with a return springing to the free or neutral position.

The switchable coupling between crank and each wheel comprise advantageously an inner cylinder surface connected with the crank and provided with one or several flat axial machined surfaces, which inner cylinder surface is surrounded by an outer herewith concentric cylinder surface that is connected with or integrated with the wheel. At the machined surfaces cylindrical axial rollers are arranged with a diameter that is larger than the distance between the cylinder surfaces but that are accommodated at the machined surfaces. Furthermore a holder is arranged for the rollers allowing a small circumferenceal movement for the rollers. By placing the holder so that the rollers are located in the middle of each machined surface the rollers will be entirely free and no force transfer can take place (neutral position). By displacing the holder in a first direction the rollers can at a relative movement of the cylinders be wedged between the machined surfaces in one direction, whereas movement in the opposite direction frees the rollers. If the holder is displaced in the opposite direction power transfer can take place in the opposite direction. Since the rollers take up little space and can transfer large forces the device becomes particularly compact and still very robust. Furthermore the possible steps become small and the drive free from play and silent. This lack of play contributes essentially to the precision in the maneuvering as well as to give the user a feel of reliability. The number of the rollers and machined surfaces can be chosen according to the torque that is to be transferred.

BRIEF DESCRIPTION OF THE DRAWINGS

Further advantages and characteristics are apparent from the following description of a preferred embodiment of the invention with reference to the enclosed drawings. In the drawings

DETAILED DESCRIPTION

Figure 4:
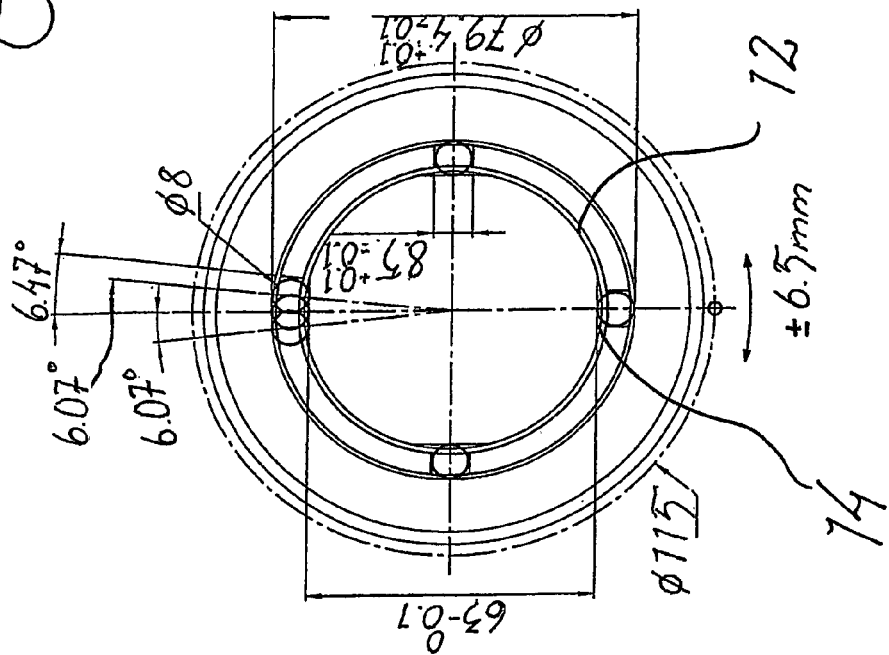
Figure 1:
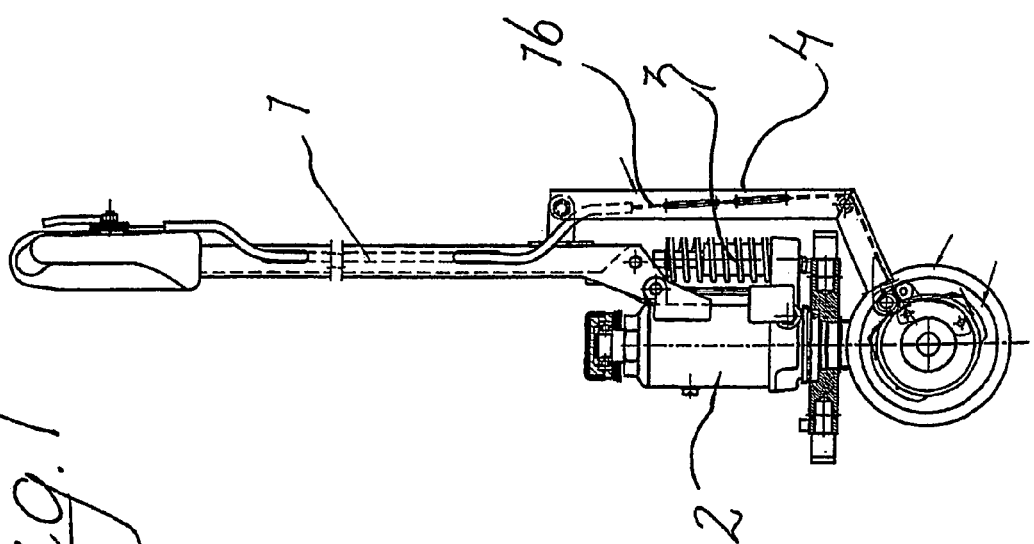
FIG. 1 depicts a device for the transfer of force from the tiller down to the drive wheel.
Figure 2:
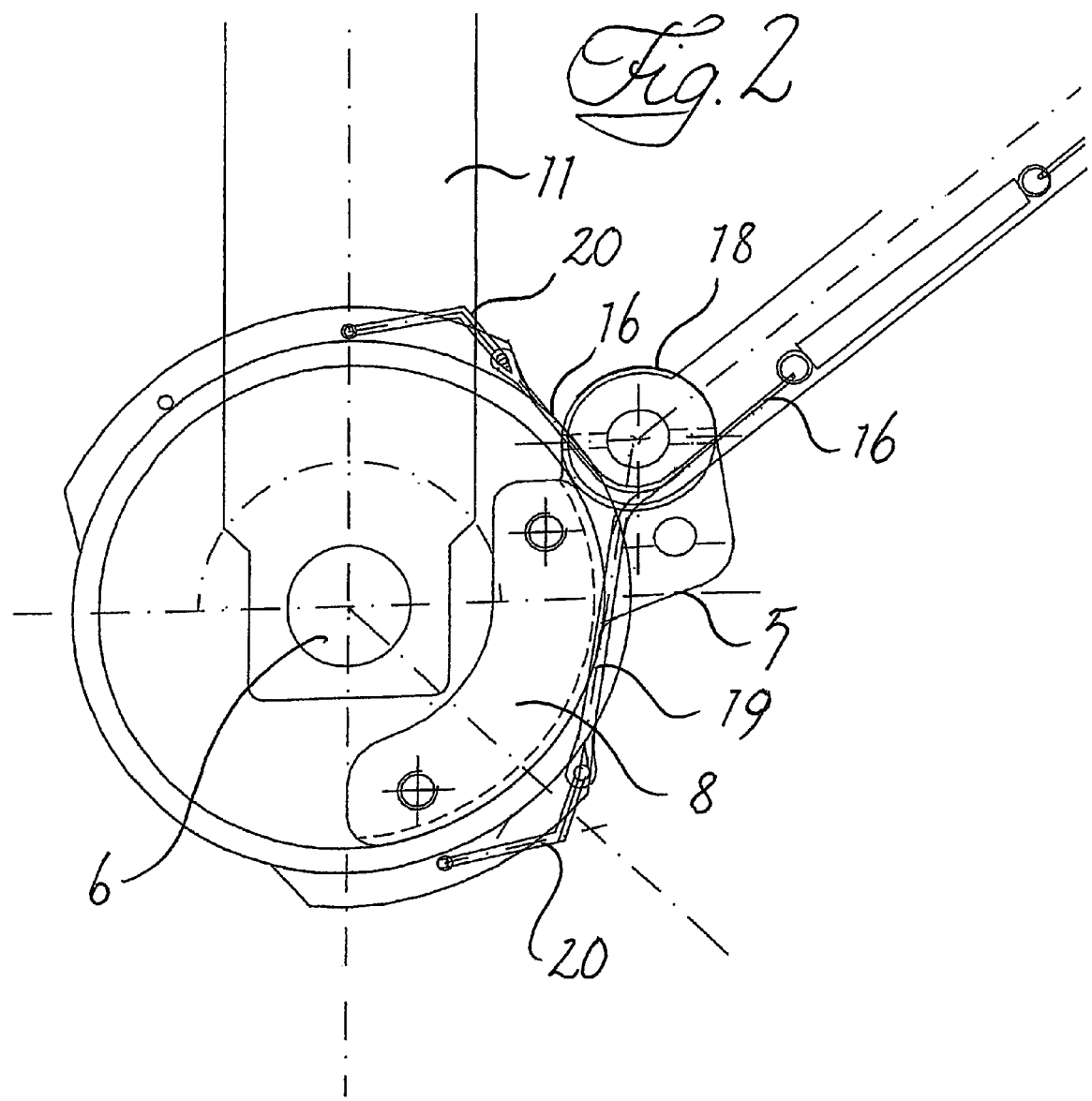
FIG. 2 shows a device for the transfer of the force to a turning, seen from the side.
Figure 3:
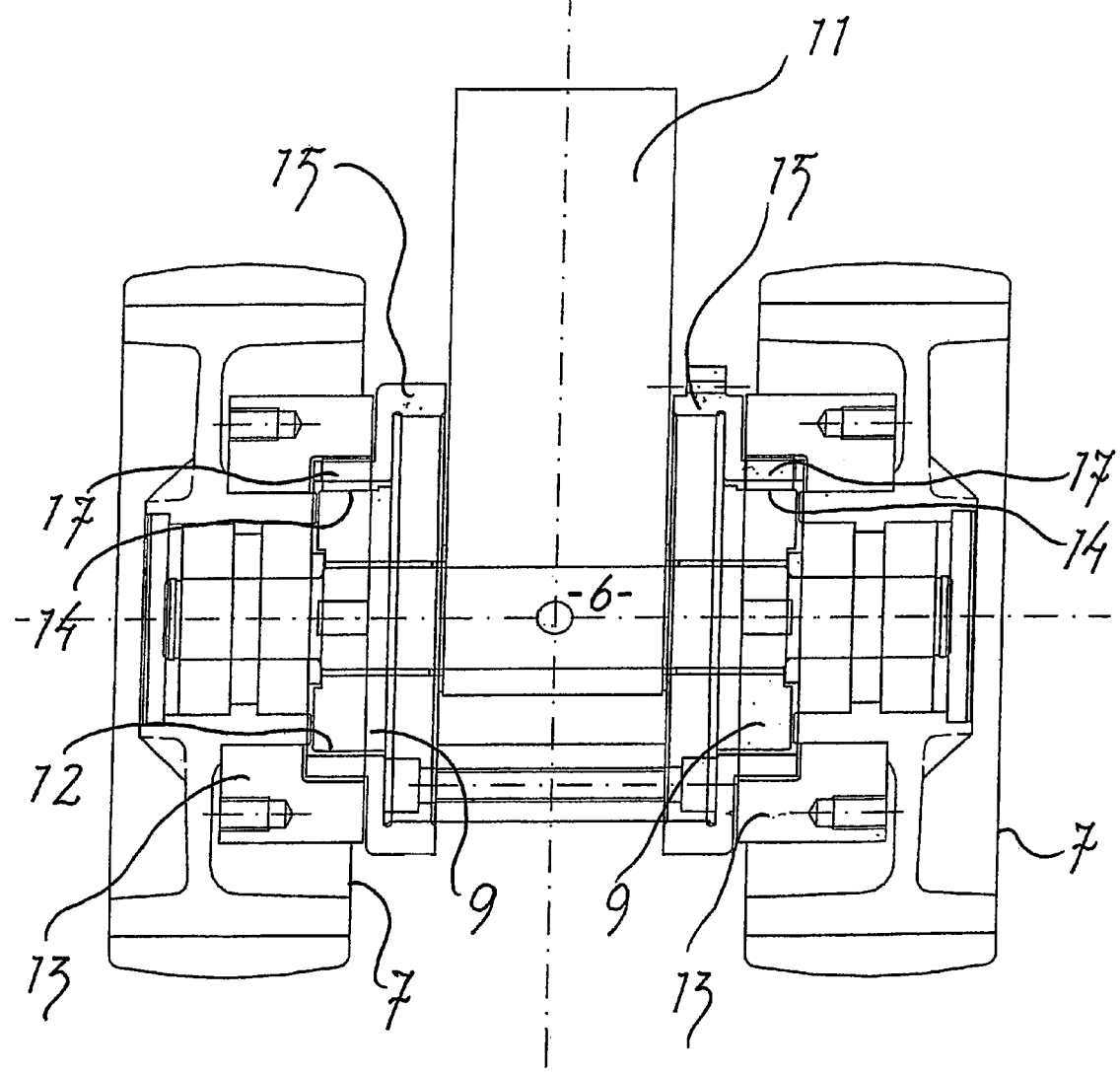
FIG. 3 shows a section in the longitudinal direction of the wheel axle in the same device, FIG. 4 details the force transfer.

The handtruck partly shown in FIG. 1 includes a lifting part with forks, not shown, and a lifting cylinder 2 that via a pumping movement of the tiller 1 via the pumping cylinder 3 can be fed with oil so that the lifting part is lifted up from the steerable wheels, at the same time also rollers in the front end of the forks are, via a linkage, not shown, pressed down against the ground to achieve a lifting parallel to the ground. In the tiller 1 a short push/pull rod 4 is articulated extending down to a crank element 5 that via a slide or roller bearing, not shown, is journaled on the axle 6 of the two steerable wheels 7 of the truck.

The crank element 5 includes in its lower end an arched part 8 to which two circular elements 9 are bolted, which are journaled on the same axle as the wheels via slide bearings. Between the circular elements the axle 6 is fastened to the lower end of a rod 11 pivotable with the tiller 1. The circular elements are on their side facing the wheels provided with a cylindrical surface 12 in which four machinings 14 have been made. Likewise circular outer parts 13 are bolted to the wheels, which parts surrounds the cylindric surface 12 and having an inner cylindrical surface. At each machining a cylindrical roller 17 is arranged with a diameter that is slightly less than the distance between the cylindrical surfaces, but that with an intermediate play is accommodated at the machining. The rollers are held in place by a roller holder 15 and when they are centered relative a machining they are free and the crank element 5 as well as the tiller can be moved freely without driving the wheels.

By pretensioning the roller holder 15 of the rollers in one direction or the other one decides in which direction the drive forces are to be transferred by the rollers being wedged at a turning of the outer cylindrical surface that pulls the roller towards the edge of the machining. At movements in the opposite direction the rollers are drawn away from the same machining edge but are by the holder prevented from reaching the other edge of the machining and therefor free movement or rotation is permitted in that direction. At a turning of the holder in the opposite direction force transfer and free running is in opposite directions respectively. If the holder is placed precisely centered, that is so that the rollers are held centered in the respective machining no reverse lock exist at all and the tiller can be lifted up and down without any influence on the wheels. As is realized it is important that this is the position when the load is lifted.

The turning of the roller holder 15 controlling drive and free run positions is by means of wires 16 and 19 that are further provided with play and slack taking springs. The wire 16 follows the push/pull rod 4 down to the crank element where it runs on the bottom side of a pulley 18 and further up to a shackle 20 fastened to the roller holder. The second wire runs between the pulley 18 and a lower pulley 21 down to a second shackle 20 fastened in the roller holder. The upper pulley is concentric with the axle of the joint connecting the crank with the push and pull rod. When the crank moves downward both wires will enclose the upper pulley with an increasing angle, that however is the same for both wires. Due to this the mutual balance or pretension relationship between the wires and the mutual relationship between roller holders and the driving inner circular and with the machining provided elements remain independent of crank movement or position until its corresponding control in the tiller arm handle has been reset.

Figure 6:
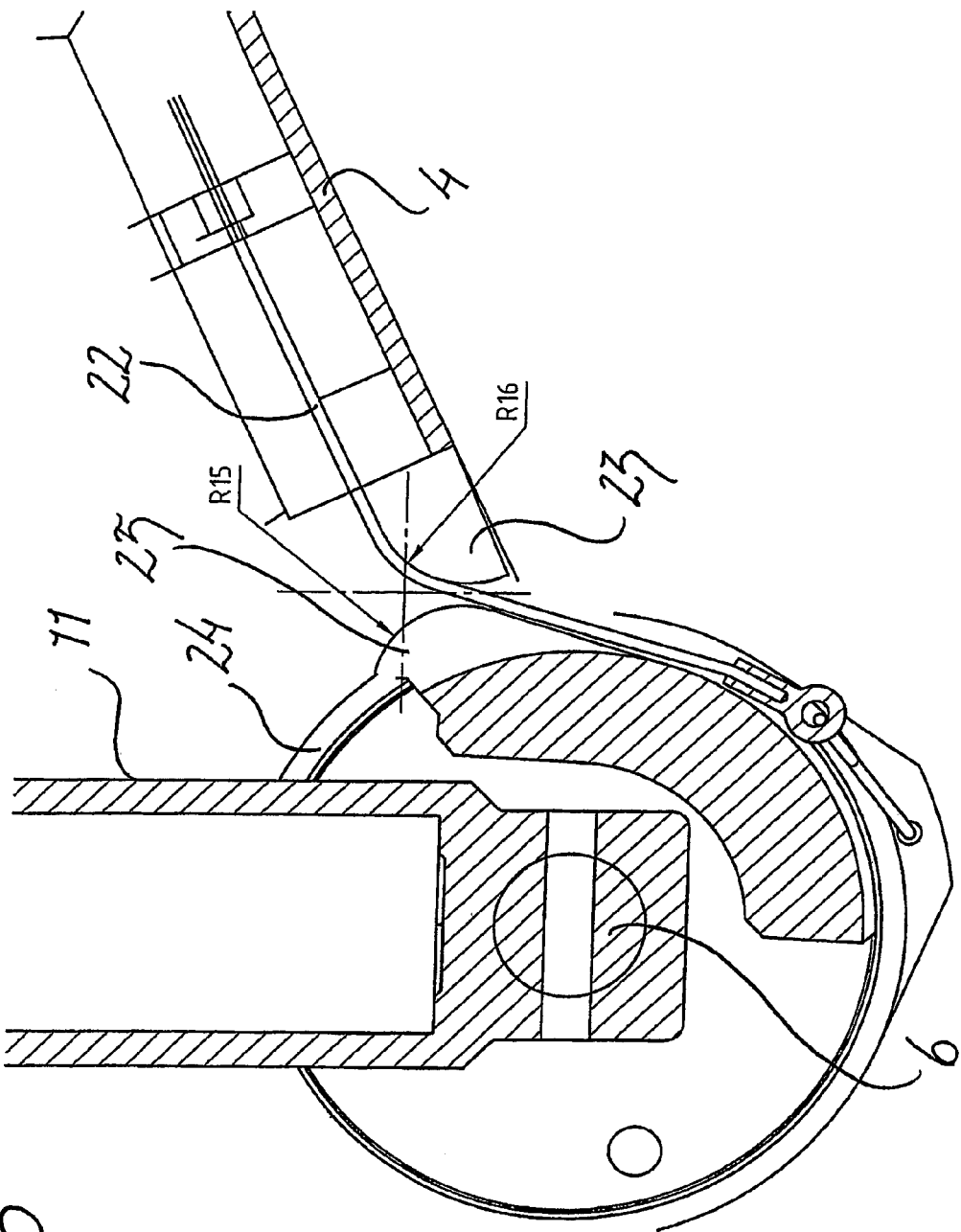
FIG. 6 shows an alternative embodiment of the device for control of the direction of the force transfer.

Instead of the above solution for the control of the coupling one can as shown in FIG. 6 consider to use only one wire 22 and two opposite the pull direction of the wire working springs (on each side) arranged in a circumferential direction between the driving inner circular parts and the roller holder. The one and only wire runs in the shown upper position of the crank movement over a curved slide surface 23 of a material with low friction down to a shackle that is fastened in the two roller holders. On the crank part 24 a smaller protrusion 25 is arranged, also this of a low friction material, more or less opposed to the curved slide surface. As the crank moves downward the enclosing angle over the curved slide surface will be diminished, but this is compensated by the protrusion on the crank part that bends the wire and thereby take up the part of its length that is released from the curved slide surface 23. Due to the low friction the wire can be tensioned or slacked in order to allow the rollers to end up in the intended control position. Since the force for moving the roller holder between the different control positions is small and the friction low the wire easily slides on the curved slide surface 23 and on the protrusion 25 at possible control movements.

Figure 5:
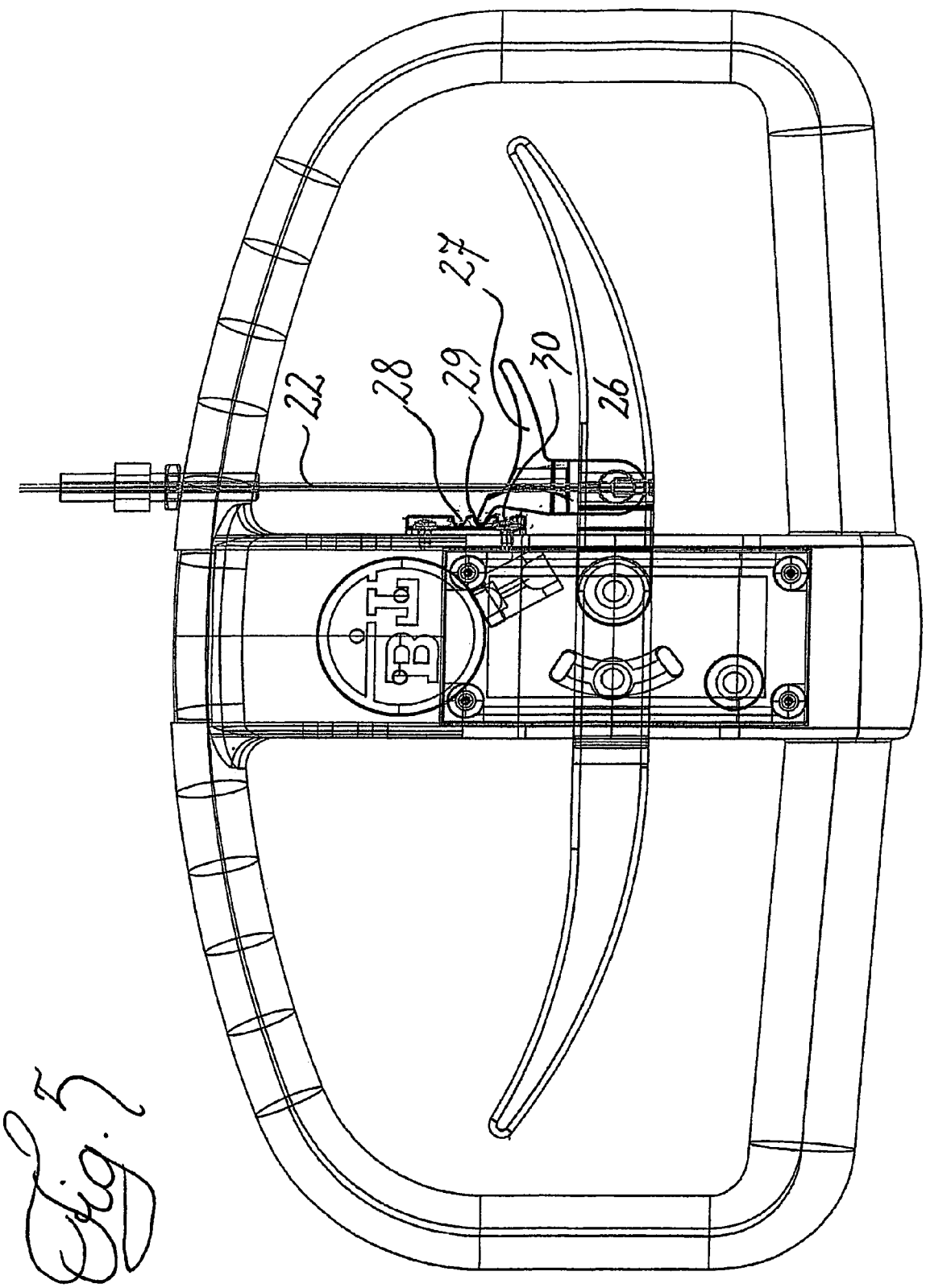
FIG. 5 shows a handle with control for the control of the device.

The handle may at the embodiment according to FIG. 6 have the design shown in FIG. 5. The wire runs to a control arm 26 provided with a lock 27 that can grip into three different recesses 28, 29, 30'. The wire runs free on the outside of the lock 27 and press the lock against its locking position, from which the lock can be lifted with a movement of the index finger.

At the arrangement of springs directly between the roller holder and the crank part one can by arranging springs in both directions pretension the roller holder toward the centrally positioned free position so that even if the control part or the wire transfer is damaged this does not prevent the use of the truck but only of the aid device.

Also at the use of two wires one can consider to use a device similar to the one used for one wire in order to eliminate the need of a change of length for the wires, which in turn can reduce or eliminate the need of springs in the wires.

The invention is of course not limited to the above described coupling device but one can also consider other types of couplings that allow transfer in arbitrary direction and free coupling, for instance the coupling may be constituted by a pad or a brake shoe that can be applied in different ends against a surrounding drum or a surrounded shaft.

One can also consider to use pairs of only in one direction working free run means that are connected as needed.

The control of the coupling can be arranged in different ways in the handle, for instance it may be possible to lock the free position, alternatively all function may be possible to lock. One can even consider the control arranged so that the coupling becomes pretensioned toward one of the driving control positions and possible to lock in the free or neutral position. This variety may particularly be achieved when there is only one wire. Also in other ways arranged springs or spring may be used to take up the change in length of the wires.

Since both the wires in the described two-wire system at pump movement change its ends the same amount and simultaneously one can use one spring to take up this movement, for instance by arranging both wires in a common and springing encasing.

Since the forces for movement of the rollers between it is different control positions are small there is no risk that a control position in opposite direction by mistake or that a finger slips release the helping force up-gearing but this remain from the initiating of its use until no force is transferred in this way. In order to reduce the risk of damages or occurring readjustments of the control system it is also here desirable with a springing wire device.

Instead of using machining on the inner cylindrical part in the coupling one can allow this to be entirely cylindrical and instead allow the surrounding, drive force receiving, and with the wheel connected part to be a polygon with rollers in the corners. Also here a roller holder is used to control the wedging direction of the rollers. Although this arrangement has the disadvantage of a more expensive outer part it also has the advantage that the maneuvering direction coincides with the drive direction so that one does not run the risk that possible surrounding rubbish happen to switch the coupling in the wrong direction.

The invention claimed is:

1. Tiller truck provided with lifting hydraulics and a force transfer mechanism and coupling for the transfer of a pumping tiller handle movement to a drive movement for the steering wheels, wherein the coupling includes an inner cylindrical part with a cylindrical surface facing outward with flat axial machinings on the circumference, said machinings having guide rollers arranged therein between an outer cylindrical part with an inward facing cylindrical surface and a roller holder for driving in a first direction to hold the rollers wedged between the machining and the outer cylindrical part for movement in one direction, or transfer for movement in the opposite direction or a neutral free position, said coupling being arranged to have three control positions, one a neutral free coupling position and two opposite directions drive force transferring positions, while movement of the tiller in the opposite direction of a set drive force transferring turning direction allows free movement without force transfer of the tiller so that the wheels can rotate freely in the drive force transferring direction.

2. Tiller truck according to claim 1, wherein control of the different coupling positions follows movement of the force mechanism.

3. Tiller truck according to claim 1, wherein control of the different coupling positions is displaceable relative to movement of the force transferring turning movement.

4. Tiller truck according to claim 1, wherein control for the coupling and lifting hydraulics are integrated in a single control.

5. Tiller truck according to claim 1, wherein transfer of movement from a control in the tiller handle to the force transferring mechanism is via two wires.

6. Tiller truck according to claim 5, wherein a pulley is arranged connected to a drive in the coupling to increase the enclosing angle of both wires by the same amount.

7. Tiller truck according to claim 6, wherein the pulley is concentric with the joint between a crank and a push-pull rod.

8. Tiller truck according to claim 6, wherein two like pull springs are arranged in each wire to take up movements that may arise in the wires as a result of the increasing enclosing angles on the pulleys.

9. Tiller truck according to claim 1, wherein control of the coupling is by a wire that is pretensioned with one or more springs.

10. Tiller truck according to claim 1, wherein at non-influenced control the control and the coupling returns to the neutral position.

11. Tiller truck according to claim 1, wherein the coupling can be locked in one or several control positions.

12. Tiller truck according to claim 7, wherein each wire is guided or runs between two curved slide surfaces on the crank and the push-pull-rod respectively so that at pumping one curved slide surface takes up the wire length that becomes free from the other curved slide surface, so that the wire retains its intended operating position corresponding to a control position.

13. Tiller truck according to claim 9, wherein the control is pretensioned toward freeing or locking of one or several control positions of the control by a control movement transferring wire or two.

14. Tiller truck according to claim 9, wherein the wire is guided or runs between two curved slide surfaces on a crank and the push-pull-rod respectively, so that at pumping one curved slide surface takes up the wire length that becomes free from the other curved slide surface so that the wire retains its intended operating position corresponding to a control position.

15. Tiller truck according to claim 10, wherein the control is pretensioned toward freeing or locking of one or several control positions of the control by a control movement transferring wire or two.

16. Tiller truck according to claim 11, wherein the control is pretensioned toward freeing or locking of one or several control positions of the control by a control movement transferring wire or two.

17. Tiller truck according to claim 12, wherein the control is pretensioned toward freeing or locking of one or several control positions of the control by a control movement transferring wire or two.

18. Tiller truck provided with a force transfer mechanism and coupling for the transfer of a pumping tiller handle movement to a drive movement for the steering wheels, wherein the coupling is arranged to have three control positions, one a neutral free coupling position and two in opposite directions drive force transferring positions, while movement of the tiller in the opposite direction of a set drive force transferring turning direction allows free movement without force transfer of the tiller so that the wheels can rotate freely in the drive force transferring direction, wherein transfer of movement from a control in the tiller handle to the force transferring part is via two wires.

19. Tiller truck according to claim 18, wherein a pulley is arranged connected to a drive in the coupling to increase the enclosing angle of both wires by the same amount.

20. Tiller truck according to claim 19, wherein the pulley is concentric with the joint between a crank and a push-pull rod.

21. Tiller truck according to claim 18, wherein two like pull springs are arranged in each wire to take up the movements that arise in the wires as a result of increasing enclosing angles on the pulleys.

22. Tiller truck provided with a force transfer mechanism and coupling for the transfer of a pumping tiller handle movement to a drive movement for the steering wheels, wherein the coupling is arranged to have three control positions, one a neutral free coupling position and two opposite directions drive force transferring positions, while movement of the tiller in the opposite direction of a set drive force transferring turning direction allows free movement without force transfer of the tiller so that the wheels can rotate freely in the drive force transferring direction, wherein control the coupling is by a wire that is pretensioned with one or more springs.

23. Tiller truck according to claim 22, wherein the control is pretensioned toward freeing or locking of one or several control positions of the control by a control movement transferring wire or two.

24. Tiller truck according to claim 22, wherein the wire is guided or runs between two curved slide surfaces on a crank and a push-pull-rod respectively so that at pumping one curved slide surface takes up the wire length that becomes free from the other curved slide surface so that the wire retains its intended operating position corresponding to a control position.

25. Tiller truck provided with a force mechanism and coupling for the transfer of a pumping tiller handle movement to a drive movement for the steering wheels, wherein the coupling is so arranged to have three control positions, one a neutral free coupling position and two in opposite directions drive force transferring positions, while movement of the tiller in the opposite direction of a set drive force transferring turning direction allows free movement without force transfer of the tiller so that the wheels can rotate freely in the drive force transferring direction, wherein transfer of movement from a control in the tiller handle to the force transferring mechanism is via two wires, and wherein each wire is guided or runs between two curved slide surfaces on a crank and a push-pull-rod respectively, so that at pumping one curved slide surface takes up the wire length that becomes free from the other curved slide surface so that the wire retains its intended operating position corresponding to a control position.

26. Tiller truck according to claim 25, wherein the control is pretensioned toward freeing or locking of one or several control positions of the control by a control movement transferring wire or two.

* * * * *